Figure 1:
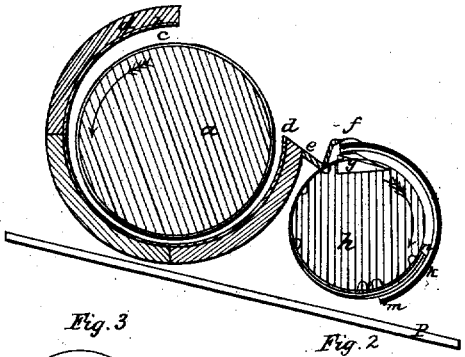
Figure 3:
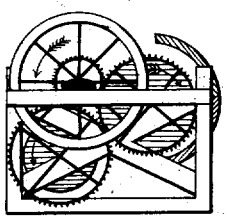
Figure 2:
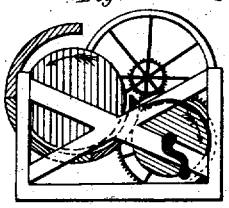
Figure 5:
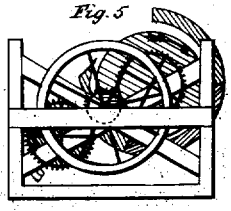
Figure 4:
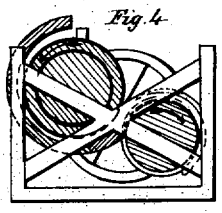

7797X

J. G. Driscoll,

Cracker Machine.

Patented Nov. 19, 1833.

N. PETERS, PHOTO-LITHOGRAPHER, WASHINGTON, D. C.

280 77977X Nov 19, 1833 131

The Schedule referred to in these Letters Patent and making part of the same containing a description ^in the words of the^ of the said Joshua G. Driscoll himself of his Improvement in the machine for moulding crackers.

Know all men by these presents that I, Joshua G. Driscoll of Auburn in the County of Cayuga and State of New York, have invented and made a new and useful machine or improvement in the moulding of crackers &c. & that the following is a full and exact description of the construction of the said machine, & of the method of its operation as invented by me.

The machine is to do the labor of moulding crackers & such other bread as can be moulded with it by altering the size of the flutes herein after described.—

Figure A. on the drawing is a side view of the effective or working part of the machine without its frame or any part of its gearing, & is drawn at twice the size of the other figures. a, is the section of a drum of say about 16 or 18 inches diameter & from one to three feet long as occasion may require & it may be made of wood and turned. this drum a, revolves inside of the part of a cylinder, d. b. in the direction indicated by the arrows.— And the dough being cut up in chunks of convenient size is thrown in between the drum and cylinder at c. & the motion of the drum inside of the cylinder rolls the dough into a long straight roll & the diminish of the space between the cylinder & drum being diminished (as per draft) reduces the roll to a given size, and discharges it at d.. from whence it rolls down against the spring clapper, e, and lies at rest, until the wheel, h, turns so far round as to bring the tappers g. on each end of this wheel (being as long as a, is,) in contact with the under edge of the clapper, (which is also the same length with the wheels a & h,) & raises it up on its springs, high enough for the roll of dough to fall on to the fluted surface of the wheel h, & the rotary motion of this wheel draws it, with a rotary motion into the space between the wheel & the cap i k, m. (a more particular description of which follows)

The drum h, may be made of wood & turned smooth & round of any convenient or required length or size. the machine which I have in operation is Fig. A. one inch to a foot or figs. 6 & 8 at one half inch to a foot & these drums are only one foot long, and the wheel h, is made of pine, with a plate of zinc cast & put on to the surface of the drum from g, to o. & n, the convex sides of the plate is fluted late[illegible] [illegible] that is from g, to o & n, with flutes which are 1/6 of an inch deep & 1/5 in breadth of a semielliptical section, or they may be semicircular if necessary, they are of the above size at the end of it at o, & n, both from o, to g, they diminish in depth one half but retain their breadth all the way which The cap i, k, m, is also made of zinc fluted in the same way, only the flutes diminish from 432. 7797X within an inch or two of the end m, to the end at f. altho' the machine will do a good business, even if the flutes were diminished from end to end.— This cap must be put up with such relation to the wheel and plate g o, so that when o & n, are opposite m, the edges between each flute (which are about [illegible] of an inch thick) shall come as close together as may be & not create too much friction & the bottoms of the flutes should be equidistant from the center of the wheel all the way from end to end & so of both fluted plates, that is, the bottoms of the flutes of the plate which is on the wheel should be parallel to the surface of the drum itself & so should those in the cap. The cap is stationary & so is the cylinder d. b.—

Now as was mentioned above, when the rolls falls into the wheel. h, every time at the same place, the rotary motion of the wheel gives a like motion to the roll which lies lengthwise of the wheel & crosswise of the flutes it rolls down from, g, in the direction of the arrow to m. & as the edges of the flutes are constantly approaching each other, until they touch or nearly so at. m. the roll of dough is condensed & rolled into balls, and is discharged from the wheel in that shape at m, onto the board p, from whence they roll on to a table to be finished as the baker may choose.—

The size of the flutes may be so varied as to make Boston crackers, soda, or butter biscuit, or anything of that sort the same or nearly the same effect may be produced with straight plates.— The wheel, h, may be turned the other way as indicated by the arrows in Figs E. & D.—

The machine may be carried or propelled by a crank by the hand, or by a foot treadle like a foot turning lathe or by any other power: one wheel may carry the other by a strap a band or by cog-wheels, with or without a balance wheel.—

But figs B & C in the way I have geared my own both with a crank as at l on B. & also have a crank attached to the journal of the balance wheel to turn it with the foot as above.

Fig. B, is a view of the front side & fig. C, of the back side Fig. D. the front and E the back side of one to have the fluted wheel go the other way. by just inverting or changing ends of the wheel h, on A. & gearing as in Figs D & C.—

It may be necessary in some cases to have the flutes on the wheel go nearly round it.

All of which I claim as my invention as applied to the above named business, that is I do not claim invention of cranks cog wheels &c but whatever is new in this machine, as the whole of fig. A & the application of cranks, wheels &c to this machine as in figs B. C. D & E & the other ways above mentioned Joshua C. Driwell Witnesses
J. L. Cole
S. B. Reed (Patented Nov. 19. 1833)
(Drawing in [illegible] folio)

Ext. W. C.
(1188 [illegible])